(12) United States Patent
Hiraguchi et al.

(10) Patent No.: US 7,021,579 B2
(45) Date of Patent: Apr. 4, 2006

(54) RECORDING TAPE CARTRIDGE

(75) Inventors: Kazuo Hiraguchi, Kanagawa (JP); Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 165 days.

(21) Appl. No.: 10/270,171

(22) Filed: Oct. 15, 2002

(65) Prior Publication Data

US 2003/0080228 A1 May 1, 2003

(30) Foreign Application Priority Data

Oct. 15, 2001 (JP) ........................ 2001-317084

(51) Int. Cl.
*G11B 23/107* (2006.01)

(52) U.S. Cl. ..................... 242/348.2; 360/132
(58) Field of Classification Search .......... 242/348, 242/348.2; 360/132
See application file for complete search history.

(56) References Cited

U.S. PATENT DOCUMENTS

| 4,045,821 A | 8/1977 | Fujikura |
| 4,383,660 A | 5/1983 | Richard et al. |
| 4,426,047 A | 1/1984 | Richard et al. |
| 5,332,173 A | 7/1994 | Kubota et al. |
| 5,570,252 A | 10/1996 | Sumner et al. |
| 5,868,333 A | 2/1999 | Nayak |
| 6,034,839 A | 3/2000 | Hamming |
| 6,349,892 B1 * | 2/2002 | Morita et al. ............ 242/347.1 |
| 6,581,865 B1 | 6/2003 | Zweighaft et al. |
| 6,742,738 B1 | 6/2004 | Hiraguchi |
| 2003/0071157 A1 | 4/2003 | Hiraguchi et al. |
| 2003/0071158 A1 | 4/2003 | Hiraguchi et al. |
| 2003/0071159 A1 | 4/2003 | Hiraguchi et al. |
| 2003/0080228 A1 | 5/2003 | Hiraguchi et al. |
| 2003/0094525 A1 | 5/2003 | Hiraguchi |
| 2003/0094527 A1 | 5/2003 | Hiraguchi |
| 2003/0094528 A1 | 5/2003 | Hiraguchi |
| 2003/0094530 A1 | 5/2003 | Hiraguchi |
| 2003/0094531 A1 | 5/2003 | Hiraguchi |
| 2003/0094532 A1 | 5/2003 | Hiraguchi |
| 2003/0106953 A1 | 6/2003 | Hiraguchi et al. |
| 2003/0178519 A1 * | 9/2003 | Hancock et al. ............ 242/348 |

FOREIGN PATENT DOCUMENTS

| JP | 61-61470 A | 12/1986 |
| JP | 63-53633 A | 10/1988 |
| JP | 09-039832 A | 2/1997 |
| JP | 11-213615 A | 8/1999 |
| JP | 11-242871 A | 9/1999 |
| JP | 11-297032 A | 10/1999 |
| JP | 2000-243056 A | 9/2000 |
| JP | 2000-331403 A | 11/2000 |
| JP | 2001-148181 A | 5/2001 |
| JP | 2001-273740 A | 10/2001 |

* cited by examiner

*Primary Examiner*—John Q. Nguyen
(74) *Attorney, Agent, or Firm*—Sughrue Mion, PLLC

(57) ABSTRACT

The present invention provides a recording tape cartridge having: a case which accommodates a single reel, on which a recording tape is wound, such that the reel is rotatable; an opening formed by cutting off a portion of a front wall of the case which front wall faces a drive device at a time when the recording tape cartridge is loaded into the drive device, the opening being for pulling-out of a leader member which is attached to an end portion of the recording tape; and a door formed in a substantial arc shape as seen in plan view, and moving along a predetermined circumference, and opening and closing the opening.

23 Claims, 17 Drawing Sheets

FIG. I

FIG. 2
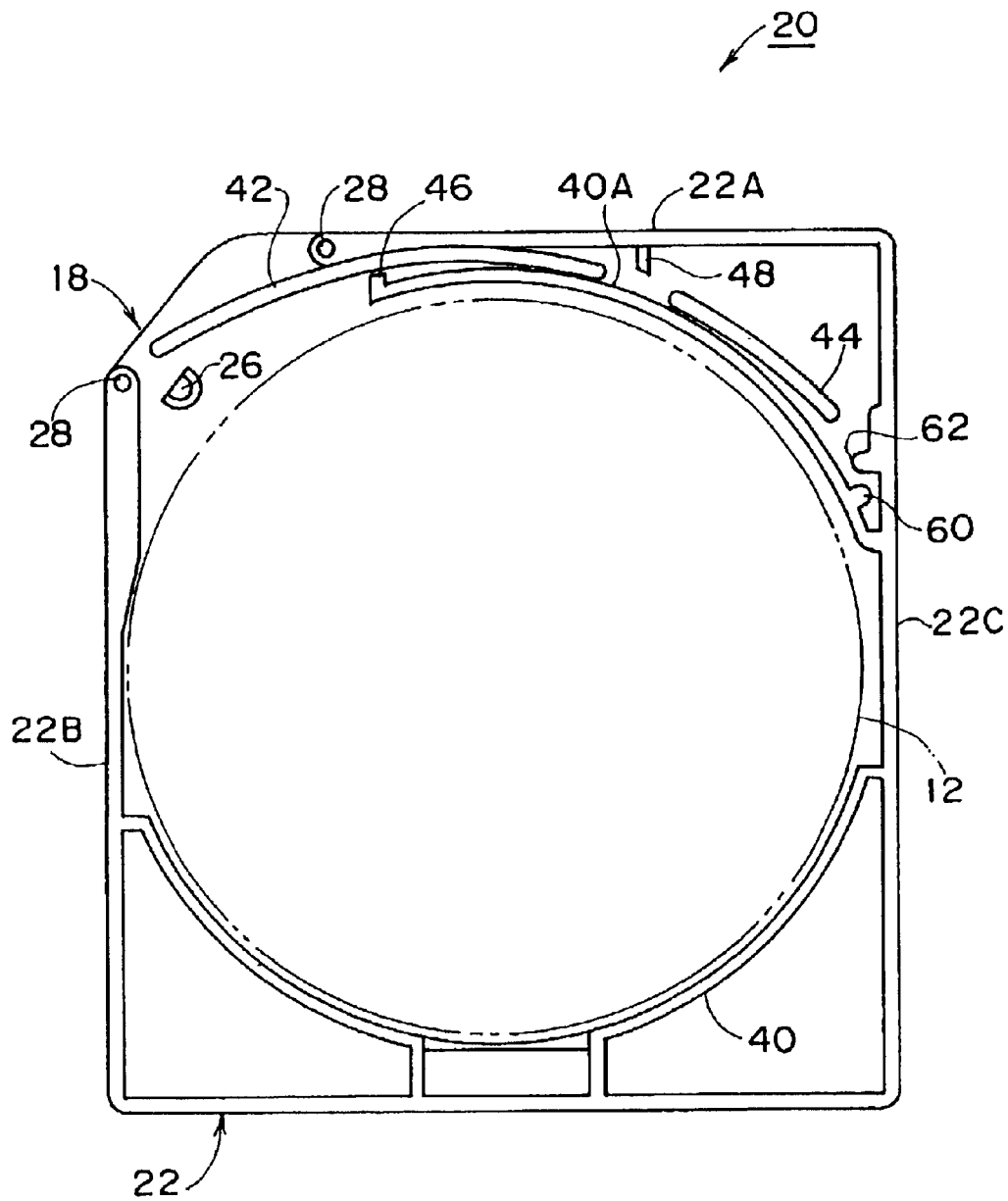
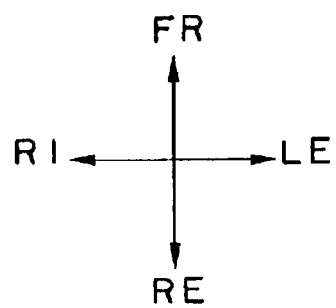

FIG. 3
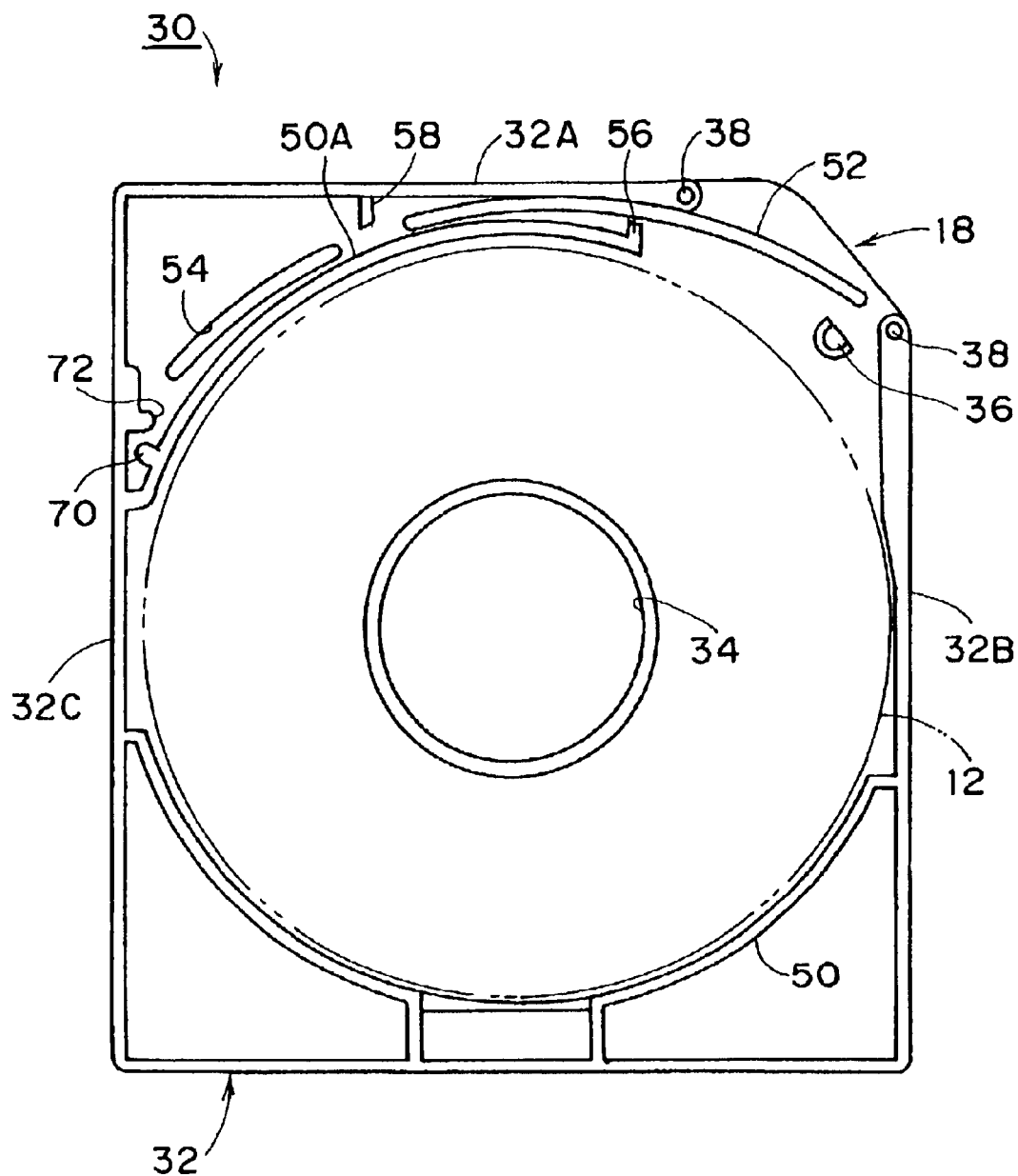
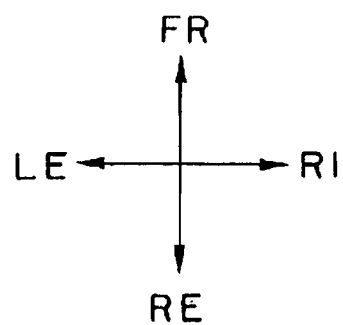

FIG. 7
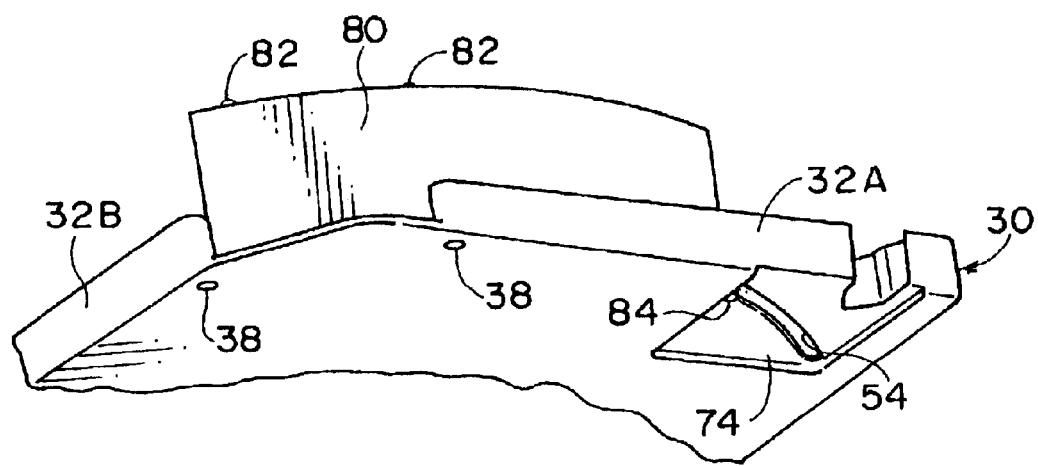
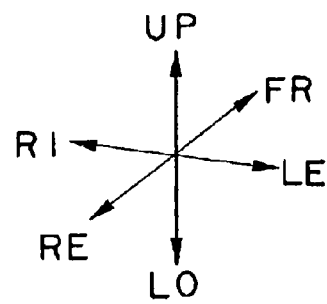

FIG. 8
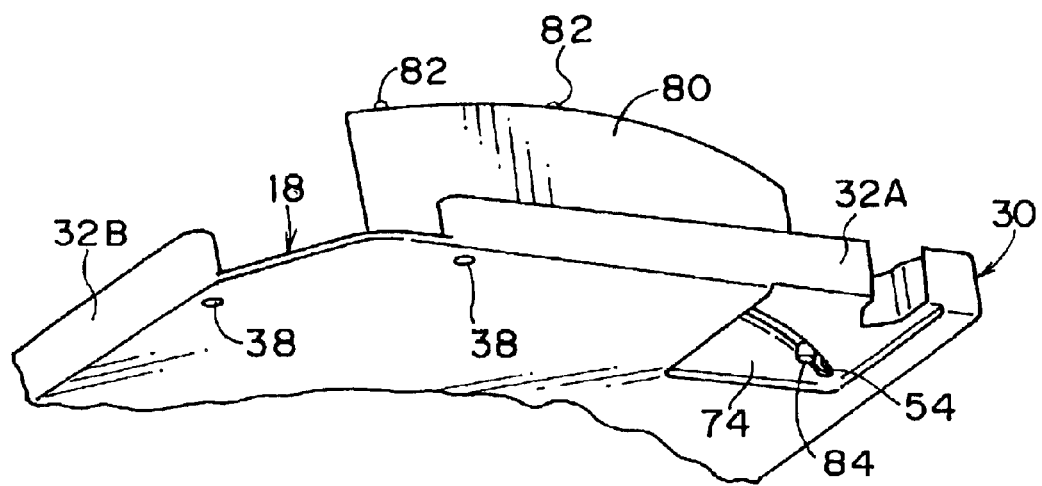
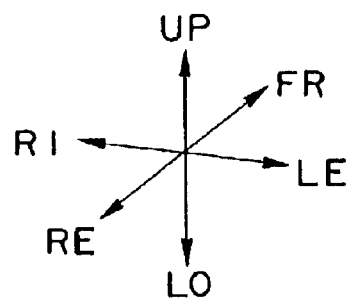

FIG. 9
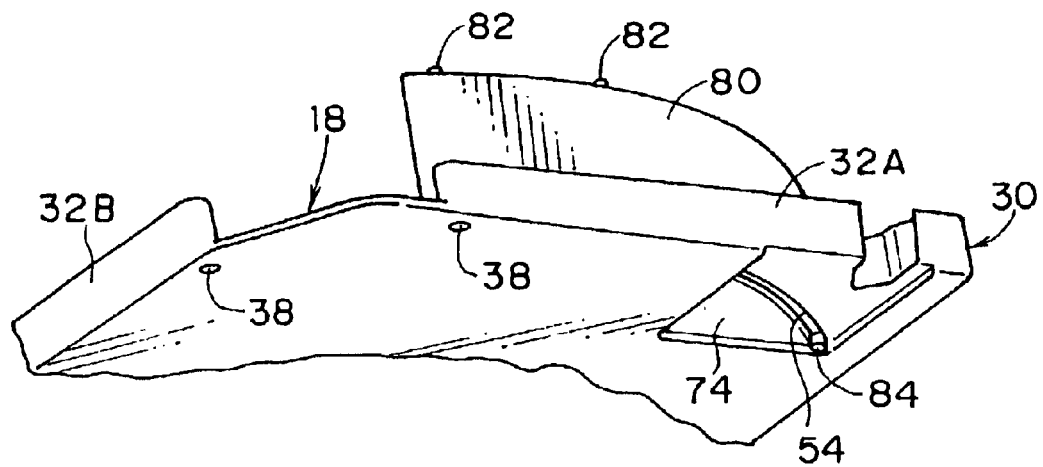
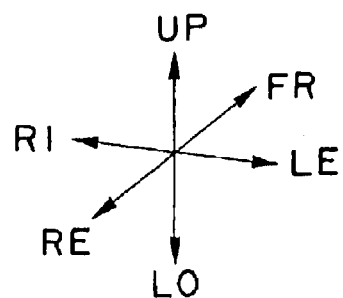

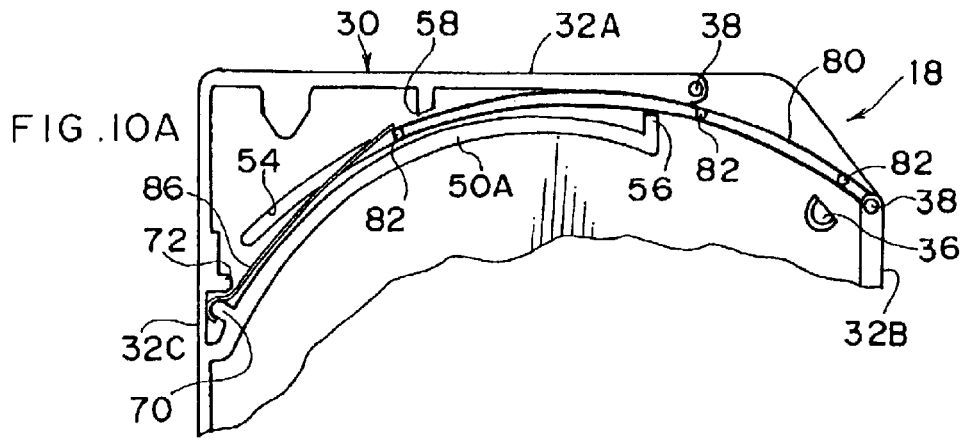
FIG.10A
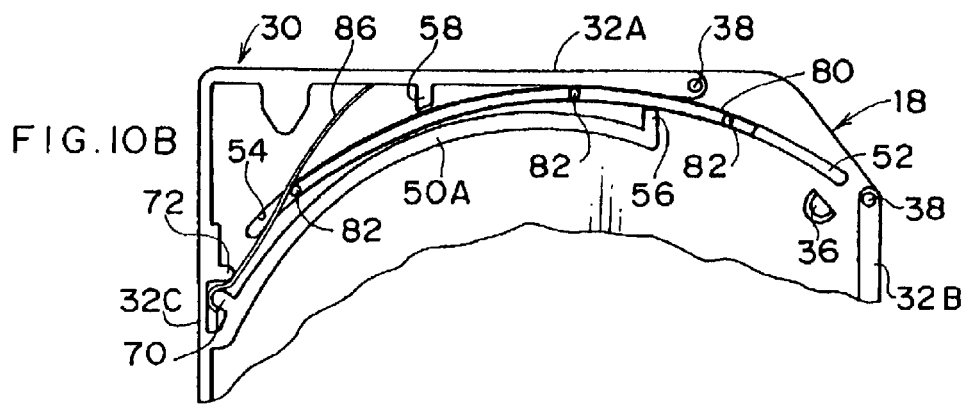
FIG.10B
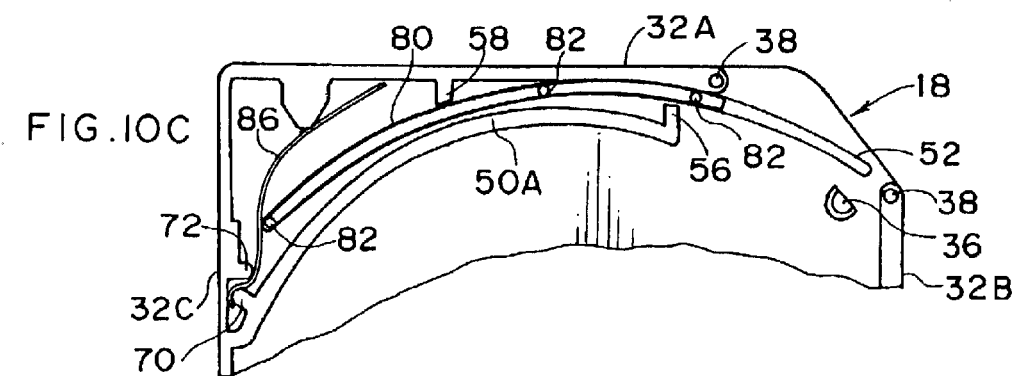
FIG.10C
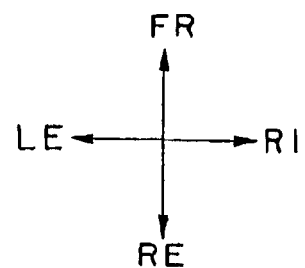

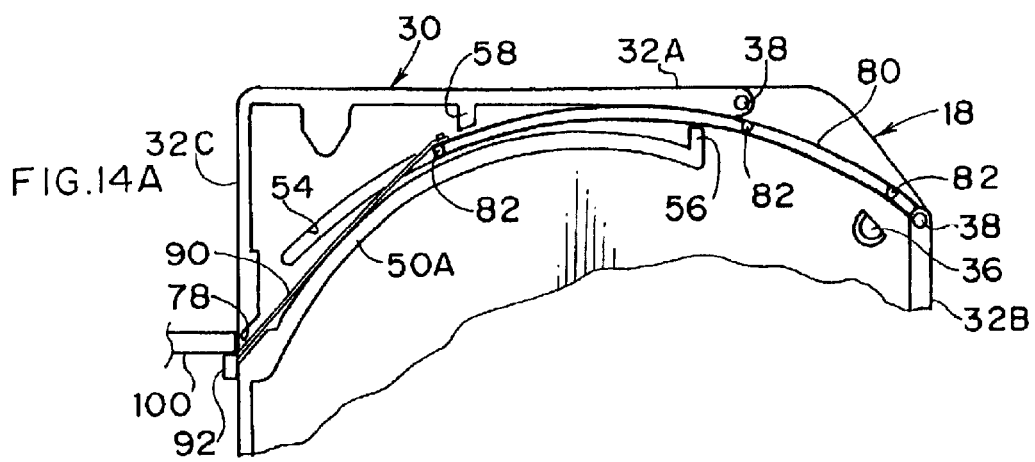
FIG.14A
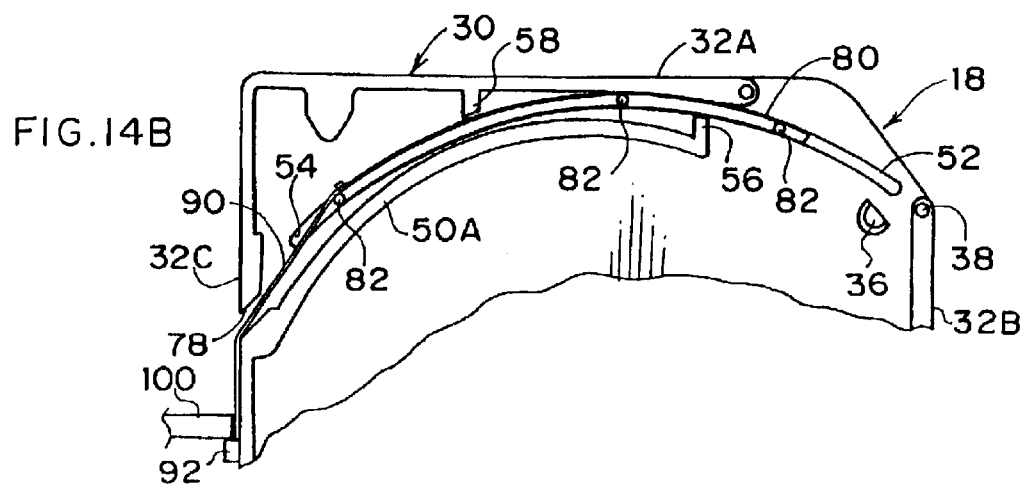
FIG.14B
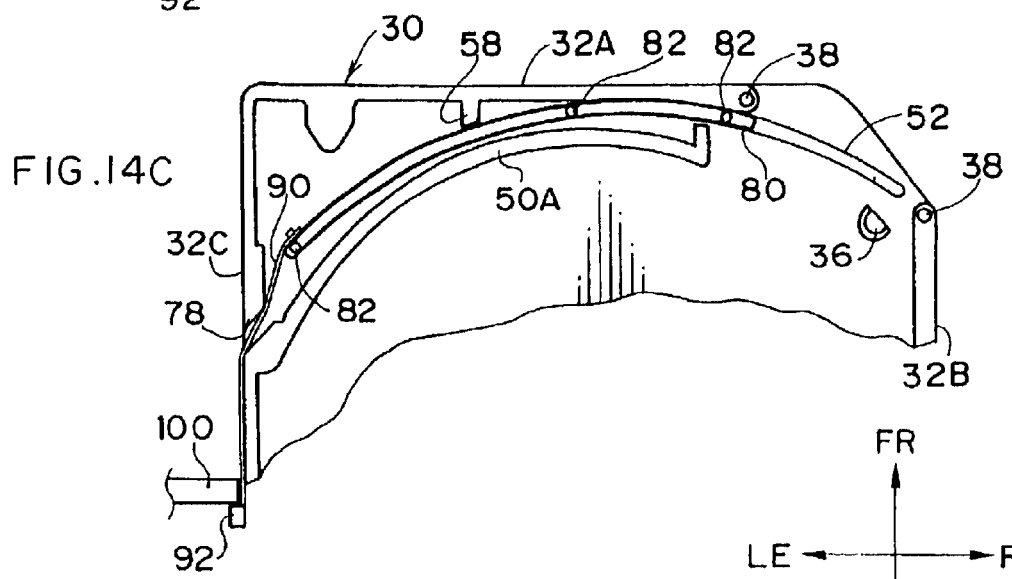
FIG.14C
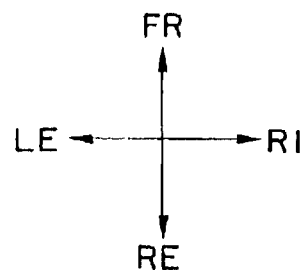

RECORDING TAPE CARTRIDGE

BACKGROUND OF THE INVENTION

1. Field of the Invention

The present invention relates to a recording tape cartridge in which a single reel is accommodated within a case, and a recording tape, such as a magnetic tape or the like, which is used as a recording/playback medium of mainly a computer or the like, is wound on the reel.

2. Description of the Related Art

Conventionally, magnetic tape cartridges have been known in which a magnetic tape, which is used as a data recording/playback medium of a computer or the like, is wound on a single reel, and the reel is accommodated within a case. A leader member, which is a leader pin, a leader tape, or a leader block, for example, is provided at the distal end of the magnetic tape. A pull-out means provided at a drive device pulls out the leader member from an opening of the magnetic tape cartridge, and the magnetic tape fixed to the leader member is wound onto a take-up reel of the drive device.

A reel gear is carved in a ring shape at the center of the bottom surface of the reel which emerges from an opening formed in the bottom surface of the magnetic tape cartridge. Due to a driving gear, which is provided at a rotating shaft of the drive device, meshing with the reel gear, the reel is driven to rotate. Further, due to the reel of the magnetic tape cartridge and the take-up reel of the drive device being rotated synchronously, data can be recorded onto the magnetic tape or data recorded on the magnetic tape can be played back.

A large amount of information can be recorded in this magnetic tape cartridge, although little space is needed to accommodate the magnetic tape cartridge when it is stored. As shown in FIGS. 15 through 17, the position of the opening of the magnetic tape cartridge and the type of door for opening and closing the opening differ in accordance with the type of the leader member. Namely, in the case of a leader pin 110, as shown in FIG. 15, an opening 118 is formed in a side wall 114 of a case 112 which side wall 114 is parallel to the direction of loading the magnetic tape cartridge into a drive device (the direction of arrow P). The opening 118 is opened and closed by a door 116 which slides in the same direction as the loading direction.

However, if the opening 118 is provided at the side wall 114 of the case 112 in this way, the pull-out means of the drive device must pull the leader pin 110 out from the left-right lateral direction of the case 112 (i.e., non-rectilinearly). Thus, space for the pull-out means to move around the case 112 must be ensured in the left-right lateral direction of the case within the drive device, and the mechanism for moving the pull-out means around (i.e., non-rectilinearly) becomes complex. In other words, the drawback arises that the drive device becomes large. Moreover, there is the problem that the path along which a magnetic tape 108 is pulled out becomes long.

Further, in the case of a leader tape 120, as shown in FIG. 16, an opening 128 is formed in a front wall 124 of a case 122 which front wall 124 is orthogonal to the direction of loading the magnetic tape cartridge into a drive device (the direction of arrow P). A door 126, which opens and closes the opening 128, is a pivoting-type door which pivots toward the front around a shaft 125 supported in a vicinity of a corner of the case 122. However, if the opening 128 is provided at the front wall 124 of the case 122 in this way, although there is no need for the pull-out means of the drive device to move non-rectilinearly, the door 126 opens over a wide area toward the front. Therefore, space must be ensured within the drive device such that nothing interferes with the door 126 when the opening 128 is to be opened. In short, a drawback arises in that the drive device becomes large.

Moreover, in the case of a leader block 130, as shown in FIG. 17, an opening 138 is formed by diagonally cutting off a corner portion 134 of the front side of the case in the direction of loading the magnetic tape cartridge into the drive device. The opening 138 is opened and closed directly by the leader block 130. However, if the opening 138 is opened and closed by the leader block 130 in this way (namely, if the leader block also functions as the door for opening and closing the opening), a problem arises in that it is easy for the leader block 130 to become scratched or dirtied. Specifically, the leader block 130 fits together with a reel hub 136 of the drive device and forms a portion of the reel hub 136. Thus, if a scratch is formed in or dirt adheres to the leader block 130, even if the scratch or dirt is a scratch or dirt which is not problematic when the leader block 130 is ordinarily used as the door, it may become difficult for the leader block 130 to fit-together with the reel hub 136, and there is the possibility that problems in the moving of the magnetic tape 108 may arise.

Moreover, the leader block 130 is merely anchored at the edge portion of the opening 138. Thus, there is the drawback that, if the magnetic tape cartridge is dropped or the like, it is easy for the leader block 130 to come apart from the opening 138. Further, because the leader block 130 is larger than the leader pin 110, a problem arises in that the number of constraints on the configuration of the case increases. Namely, the leader pin 110, whose function is separate from that of a door, is technically superior to the leader block 130 which also functions as a door.

SUMMARY OF THE INVENTION

An object of the present invention is to provide a recording tape cartridge in which a door which closes an opening and a leader member for the pulling out of a recording tape are separate members, and which is provided with an opening which makes the pull-out path of the recording tape the shortest, and with a door which can open and close the opening in a small space, so as to aim to make a drive device more compact.

In order to achieve the above-described object, a first aspect of the present invention is a recording tape cartridge comprising: a case which accommodates a single reel, on which a recording tape is wound, such that the reel is rotatable; an opening formed by cutting off a corner portion of the case at a front side in a direction of loading the recording tape cartridge into a drive device, the opening being for pulling-out of a leader member which is attached to an end portion of the recording tape; and a door formed in a substantial arc shape as seen in plan view, and moving on a predetermined circumference, and opening and closing the opening.

In this way, when the opening is provided by cutting off a front side corner portion of the case, the open surface of the opening can face the direction of insertion of the recording tape cartridge into the drive device. Therefore, the pull-out means of the drive device can enter in from the front side, and the path along which the recording tape is pulled out can be made to be the shortest. Accordingly, there is no need at the drive device for a complex mechanism for making the recording tape move non-rectilinearly (i.e., around the case), and it is possible to design a drive device which is compact and has a low manufacturing cost. Further, because the recording tape passes along the shortest path, the wear of the recording tape due to contact with a tape guide can also be reduced.

The door is formed in a substantial arc shape as seen in plan view, and moves on a predetermined circumference. Therefore, the opening can be made large, the structure is simple, and less space is used (the door can move on a locus which runs substantially along the outer peripheral portion of the reel). The space within the case and within the drive device can be utilized efficiently. Accordingly, the area for the cartridge within the drive device can be made small, and the drive device can be made compact.

BRIEF DESCRIPTION OF THE DRAWINGS

FIG. 2 is a schematic plan view of an upper case of the magnetic tape cartridge of FIG. 1.

FIG. 3 is a schematic plan view of a lower case of the magnetic tape cartridge of FIG. 1.

FIG. 7 is a schematic perspective view, as seen from below, of the state in which the door closes the opening.

FIG. 8 is a schematic perspective view, as seen from below, showing a state in the midst of progression from the state in which the door closes the opening to the state in which the opening is open.

FIG. 9 is a schematic perspective view, as seen from below, of the door when the opening is open.

FIGS. 10A through 10C are schematic plan views showing processes of opening the door.

FIGS. 14A through 14C are schematic plan views showing processes of opening a door in accordance with a third embodiment of the present invention.

DESCRIPTION OF THE PREFERRED EMBODIMENTS

Hereinafter, a first embodiment of the present invention will be described in detail on the basis of the drawings. For convenience of explanation, the direction of loading the recording tape cartridge into a drive device (the direction of arrow P) is called the "front direction", and the other directions of, back, left, right, top, and bottom will be specified and expressed on the basis of this front direction. Further, a magnetic tape is used as the recording tape, and hereinafter, explanation will be given with regard to a magnetic tape cartridge.

Figure 1:
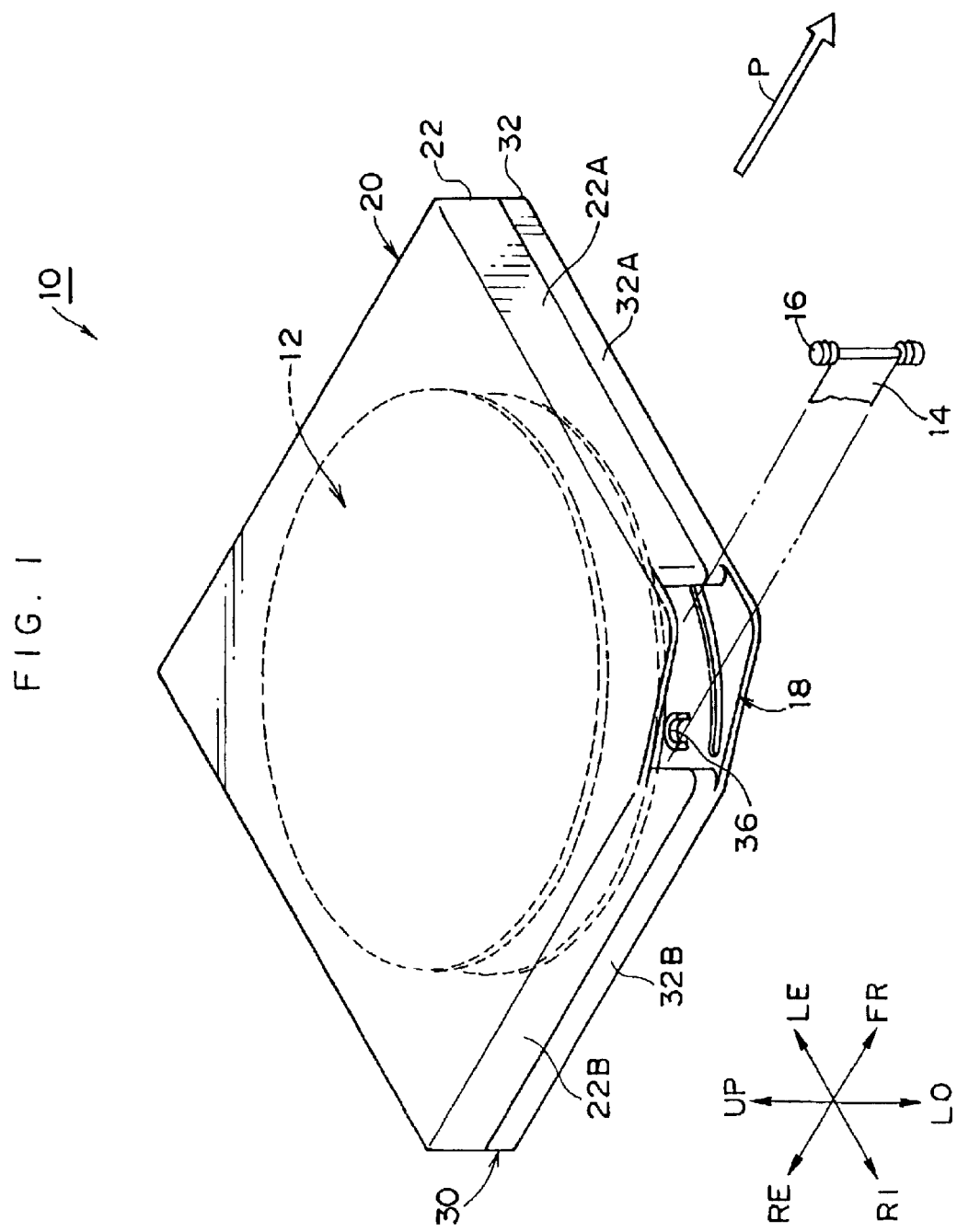
FIG. 1 is a schematic perspective view of a magnetic tape cartridge of the present invention.
Figure 4:
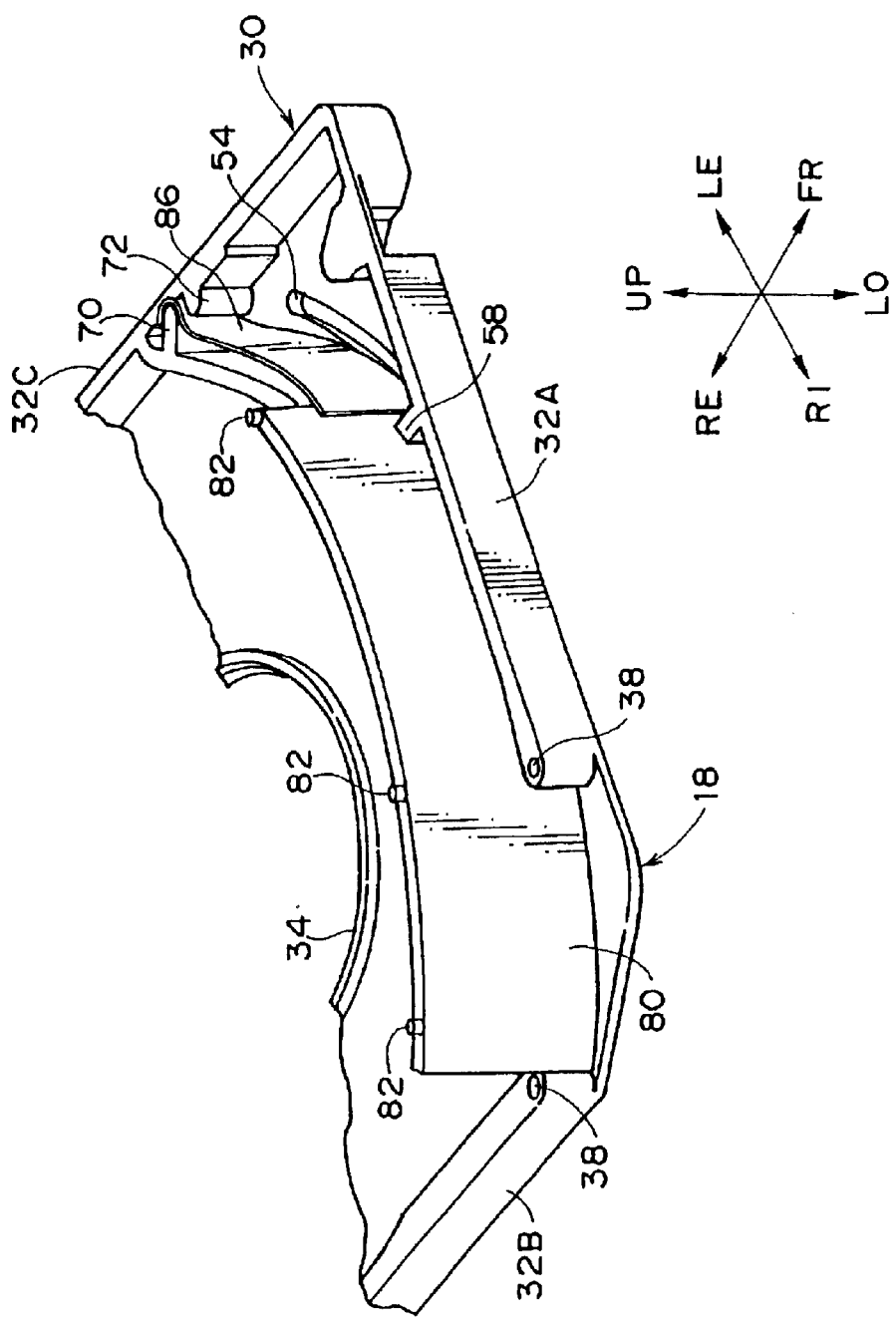
FIG. 4 is a schematic perspective view, as seen from above, showing a state in which a door (of the magnetic tape cartridge) closes an opening in accordance with a first embodiment of the present invention.
Figure 5:
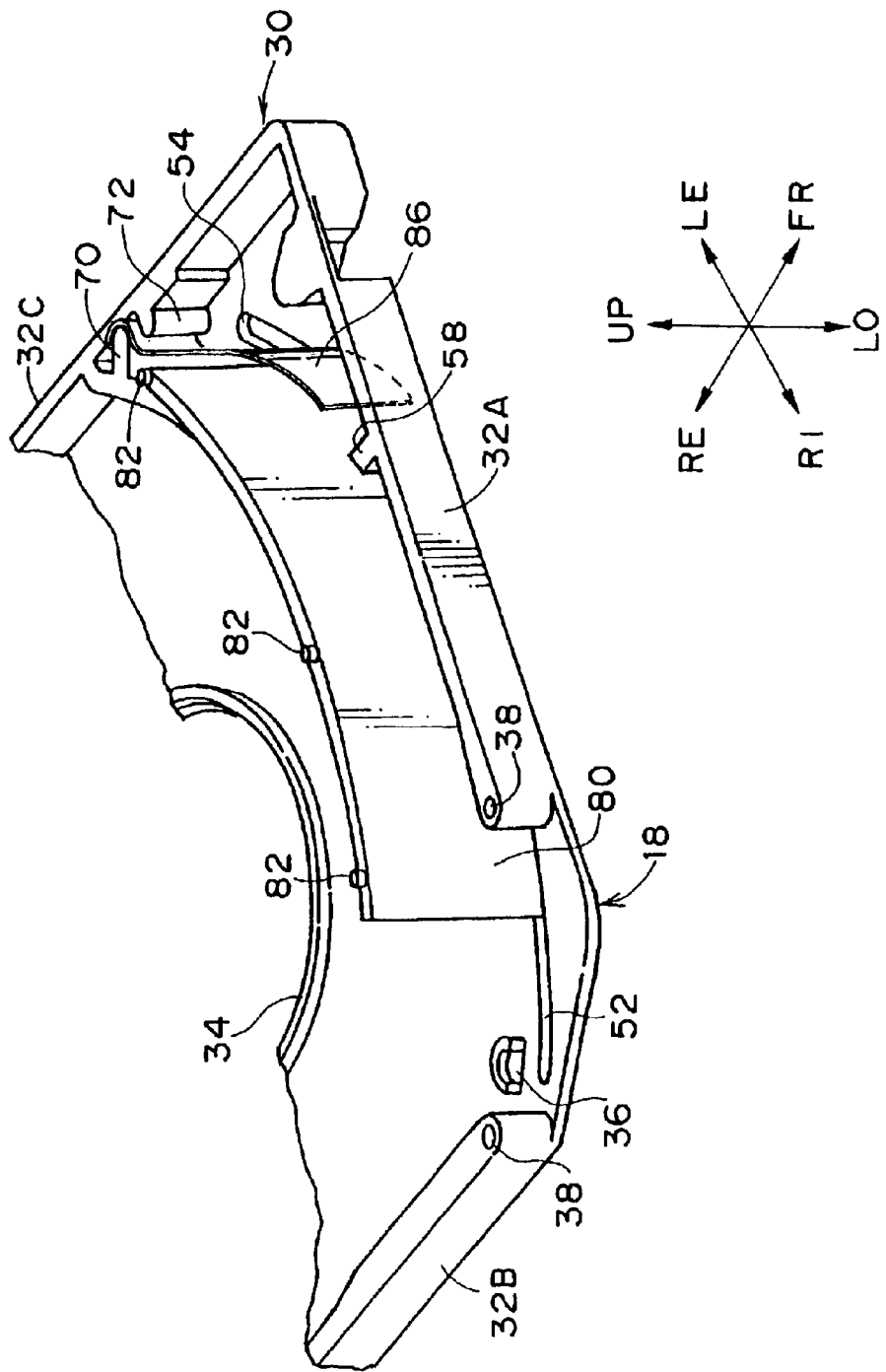
FIG. 5 is a schematic perspective view, as seen from above, showing a state in the midst of progression from the state in which the door closes the opening to a state in which the opening is open.
Figure 6:
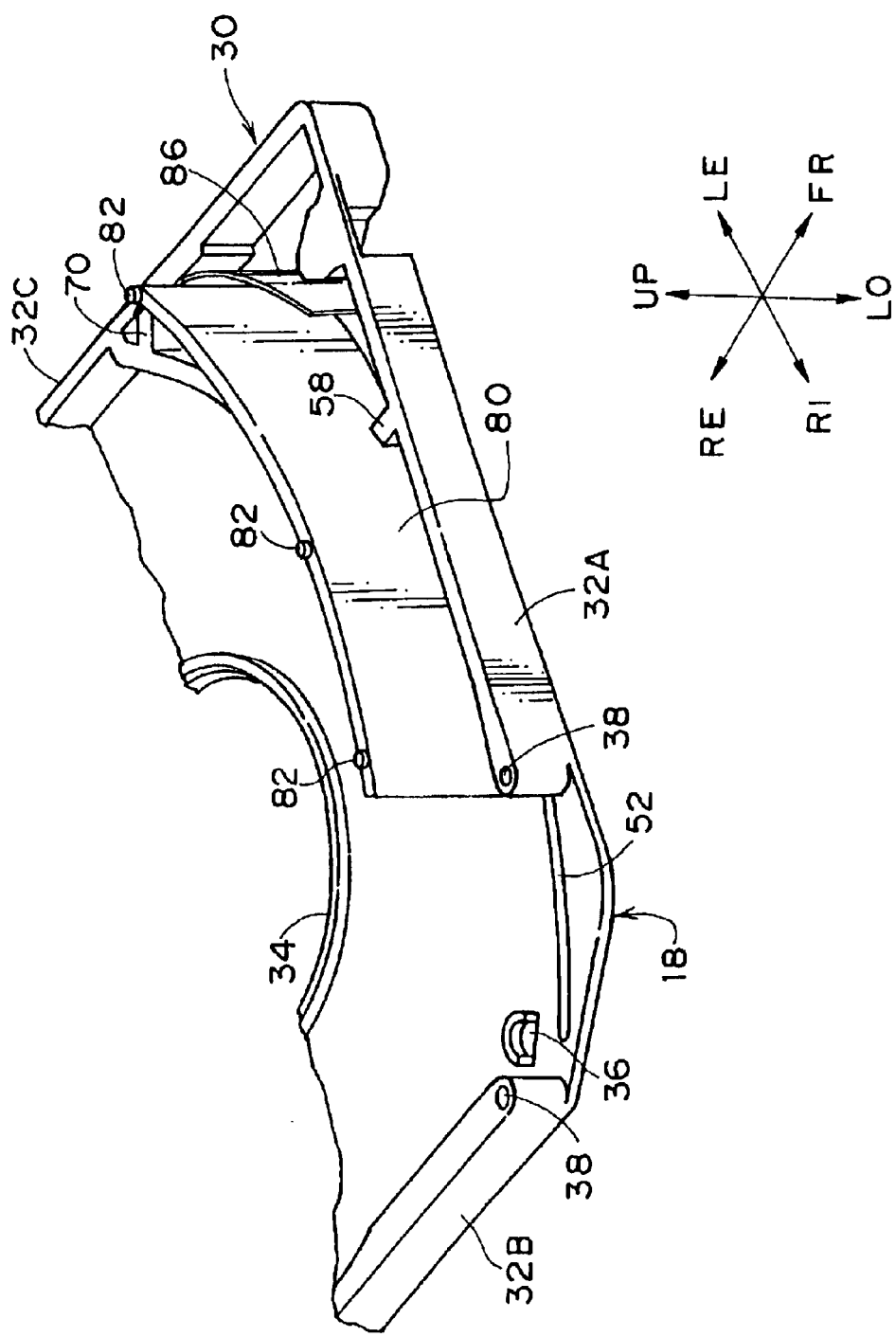
FIG. 6 is a schematic perspective view, as seen from above, of the door when the opening is open.

As shown in FIGS. 1 through 3, a magnetic tape cartridge 10 is formed in the shape of a substantially rectangular box by an upper case 20 and a lower case 30, respectively formed from a synthetic resin, being joined together in a state in which peripheral walls 22, 32 thereof abut one another (Note that the shape of the cartridge or the cases of the first and other embodiments of the present invention is not limited to a rectangular box, and any modification thereof or even other shapes are also acceptable unless the shapes contradict the spirit of the present invention). A single reel 12, on which is wound a magnetic tape 14 serving as an information recording/playback medium, is rotatably accommodated in the interior of the magnetic tape cartridge 10. A circular opening 34, which is for exposing a reel gear (not illustrated) of the reel 12, is formed substantially in the center of the bottom case 30.

The front, right corner portion of the magnetic tape cartridge 10 is cut off at an incline (of 45° for example) as seen in plan view, and an opening 18 is formed at this portion. This opening 18 is provided for the pulling-out, to the exterior, of the magnetic tape 14 which is wound on the reel 12. When the magnetic tape cartridge 10 is not being used (i.e., when the magnetic tape cartridge 10 is not loaded in a drive device), the opening 18 is closed by a door 80 which will be described later. When the magnetic tape cartridge 10 is being used (i.e., when the magnetic tape cartridge 10 is loaded in a drive device), the door 80 is opened, and a leader pin 16, which is attached to the distal end of the magnetic tape 14, is pulled-out by a pull-out means (not illustrated) of the drive device.

The area over which the opening 18 is open is large at the front side peripheral walls (hereinafter called "front walls") 22A, 32A, so that a certain amount of error is permitted at the path of entry at the time when the pull-out means enters into the opening 18, and the pull-out means pulls-out the magnetic tape 14 quite rectilinearly, along the substantially shortest distance. Accordingly, the pull-out path of the magnetic tape 14 can be made to be the shortest. As a result, the drive device can be made more compact, and the manufacturing costs can be reduced. Further, it is thereby possible to reduce wear due to contact with a tape guide (not illustrated) of the drive device.

Screw bosses 28, which do not penetrate through, and screw bosses 38, which do penetrate through, are provided at the right end portions of the front walls 22A, 32A and at the front end portions of right side peripheral walls (hereinafter, "right walls") 22B, 32B forming the opening 18, so that the upper case 20 and the lower case 30 can be fixed together by screws (not shown) which are screwed in from below. Accordingly, rigidity in a vicinity of the opening 18 is ensured, and the drop strength and buckling strength can be improved.

A leader pin 16 is substantially formed in the shape of a dumbbell such that the top end portion and the bottom end portion thereof protrude out with larger diameters than the central portion of the leader pin 16. The distal end of the magnetic tape 14 is fixed by an adhesive or the like to the central portion of the leader pin 16. When the magnetic tape cartridge 10 is not in use, the top end portion and the bottom end portion of the leader pin 16 are anchored respectively on anchor portions 26, 36, which are formed in substantially semicircular arc shapes as seen in plan view and are provided in vicinities of the right walls 22B, 32B of the upper case 20 and the lower case 30, so that the leader pin 16 is held in a vicinity of the opening 18.

Inner walls 40, 50, which are substantially formed as short, hollow cylinders and which have inner diameters slightly larger than the outer diameter of the reel 12 and which regulate the position of the outer peripheral edge of the reel 12, are provided to stand upright at the upper case 20 and the lower case 30. The door 80, which opens and closes the opening 18, is provided slidably between the front walls 22A, 32A and inner walls 40A, 50A at the front sides of the inner walls 40, 50.

As shown in FIGS. 4 through 10, the door 80 is plate-shaped and bends in a substantial arc shape as seen in plan view. A substantially solid cylindrical (i.e., rod-shaped) projection 82 is formed at the top surface and the bottom surface in a vicinity of the right end portion, at the top surface and the bottom surface at the substantially central portion, and at the top surface and the bottom surface of the left end portion of the door 80. In particular, a projection 84 projecting at the bottom surface of the left end portion is formed so as to be slightly higher (longer) than the other projections, and projects from a guide hole 54 which will be described later, and serves as an operation portion for operating the door 80 to open and close.

As shown in FIGS. 2 and 3, projecting ribs 46, 56 are formed so as to be bent toward the front, at the opening 18 side end portions of the inner walls 40A, 50A. At the substantially central portions of the inner surfaces of the front walls 22A, 32A as well, projecting ribs 48, 58 project toward the rear. The distal end surfaces of the projecting ribs 46, 56 and the projecting ribs 48, 58 are formed in substantial arc shapes, in plan view, which run along the rear surface and the front surface of the door 80. When the door 80 moves, the door 80 can be supported from the front and the rear by the distal end surfaces of the projecting ribs 46, 56 and the projecting ribs 48, 58 contacting the rear surface and the front surface of the door 80.

Between the inner walls 40A, 50A (including the projecting ribs 46, 56) and the front walls 22A, 32A of the upper case 20 and the lower case 30, guide grooves 42, 52, which are substantially arc shaped as seen in plan view and into which the projections 82 can be inserted, are formed from vicinities of the front ends of the right walls 22B, 32B to vicinities of the right sides of the projecting ribs 48, 58. Further, from vicinities of the left sides of the projecting ribs 48, 58 to vicinities of left side peripheral walls (hereinafter called "left walls") 22C, 32C, a guide groove 44, which is substantially arc shaped in plan view and into which the projections 82 can be inserted, is formed in the upper case 20, and the guide hole 54, which is substantially arc shaped in plan view and into which the projection 84 (operation portion) can be inserted, is formed in the lower case 30.

The door 80 moves along a locus which runs substantially along the outer peripheral portion of the reel 12 (the outer peripheries of the inner walls 40A, 50A), such that the space within the case can be utilized efficiently. In this way, the area required for accommodating the magnetic tape cartridge 10 within the drive device can be reduced. Moreover, the guide grooves 42, 44 of the upper case 20 and the guide groove 52 and the guide hole 54 of the lower case 30 are provided on the same circumference which has a different center than the center of the reel 12. Thus, the size, configuration and the like of the opening 18 can be set freely.

Namely, if the center of rotation of the door 80 does not coincide with the center of rotation of the reel 12, there are no constraints in terms of space. Therefore, the size of the door 80 can be set freely, and this structure can be applied to openings 18 of any size. Accordingly, it is possible to make the opening 18 large, and, as described above, to aim to make the drive device more compact.

Anchor ribs 60, 70 project in vicinities of the left end portions of the front side inner walls 40A, 50A. Anchor ribs 62, 72 project from the inner surfaces of the left walls 22C, 32C in vicinities of the anchor ribs 60, 70. The left end portion of a plate spring 86 is held by the anchor ribs 60, 70 and the anchor ribs 62, 72. The right end portion of the plate spring 86 abuts and engages with the left end portion of the door 80. The plate spring 86 always urges the door 80 in the direction of closing.

In this way, if the plate spring 86 which urges the door 80 is provided at a different place than the opening 18 (i.e., at the side opposite the opening 18), the space within the case can be utilized efficiently, and the space at the opening 18 side can be made wider. Therefore, the holding position of the leader pin 16 can be set over a wide width, and the degrees of freedom of design of the drive device can be increased.

Further, as shown in FIGS. 7 through 9, a recess 74, which is square in plan view, is formed in the bottom surface of the lower case 30, at the portion where the guide hole 54 is provided. The recess 74 serves as a tolerance portion such that the projection (operation portion) 84 which projects out from the guide hole 54 does not project further than the lower surface (other than the recess 74) of the bottom case 30 as seen in side view. Note that this recess 74 can also be used as a reference surface for positioning with respect to the bucket of the drive device. Further, although the recess 74 of the present embodiment is formed in a square shape as seen in plan view, the configuration of the recess 74 is not particularly limited provided that the recess 74 can be used as a reference surface for positioning.

Providing the projecting ribs 46, 48, 56, 58 is preferable because these projecting ribs 46, 48, 56, 58, together with the inner walls 40A, 50A, form a labyrinthine structure which can prevent entry, toward the reel 12, of dust and the like which have entered in from the guide hole 54. However, it suffices to not provide the projecting ribs 46, 48, 56, 58 as long as the guide grooves 42, 44, 52 and the projections 82 are provided. Conversely, it suffices to not provide the guide grooves 42, 44, 52 and the projections 82 as long as the projecting ribs 46, 48, 56, 58 are provided.

The door 80 having the above-described structure is opened and closed as follows. Namely, as shown in FIGS. 4 through 10, when the magnetic tape cartridge 10 is loaded into the bucket of a drive device, accompanying this loading, an opening/closing member (not illustrated) abuts the projection (operation portion) 84 projecting from the guide hole 54, and pushes the projection (operation portion) 84 relatively toward the rear against the urging force of the plate spring 86.

Therefore, the projection (operation portion) 84 moves toward the left and the rear along the guide hole 54, and the projections 82 slide along the guide grooves 42, 44, 52. The door 80 thereby slides toward the left and is accommodated at the inner sides of the front walls 22A, 32A, and the opening 18 is opened. Conversely, when the magnetic tape cartridge 10 is to be removed from the bucket, the opening/ closing member (not illustrated) releases the pushing of the projection (operation portion) 84, and therefore, the door 80 slides toward the right due to the urging force of the plate spring 86, such that the opening 18 is closed.

The door 80 is structured so as to move as the magnetic tape cartridge 10 is loaded into the drive device, and thereby opens and closes the opening 18. The projections 82 projecting from the top and bottom surfaces of the door 80 are inserted into the respective guide grooves 42, 44, 52, and the rear surface and the front surface of the door 80 are regulated (supported) by the projecting ribs 46, 56 and the projecting ribs 48, 58. In this way, the door 80 slides in left and right directions while being appropriately guided. Accordingly, no problems arise in the operations of opening and closing the door 80. Note that, although the guide hole 54 is provided, because entry of dust and the like toward the reel 12 is impeded by the above-described labyrinthine structure, the magnetic tape cartridge 10 can be kept substantially free of dust.

Figure 11:
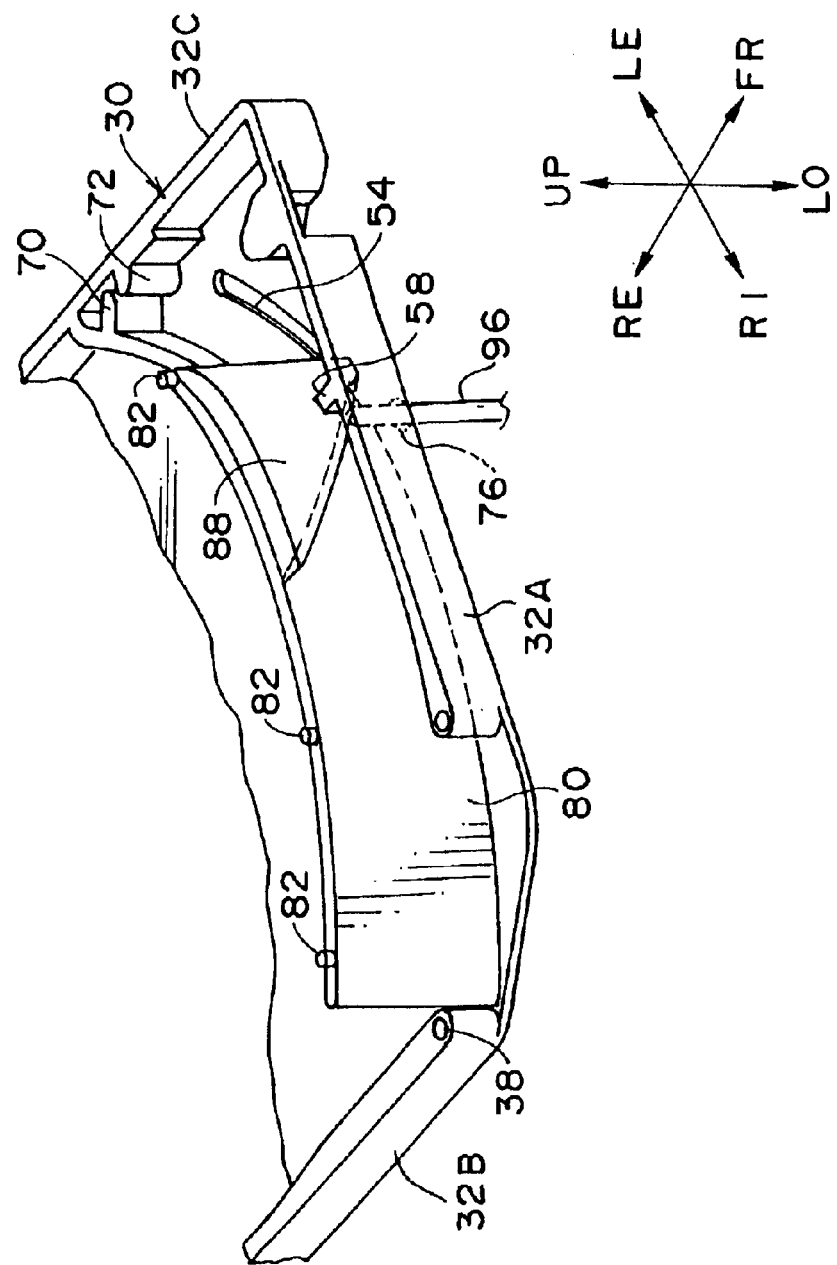
FIG. 11 is a schematic perspective view showing a state in which a door closes an opening in accordance with a second embodiment of the present invention.
Figure 12:
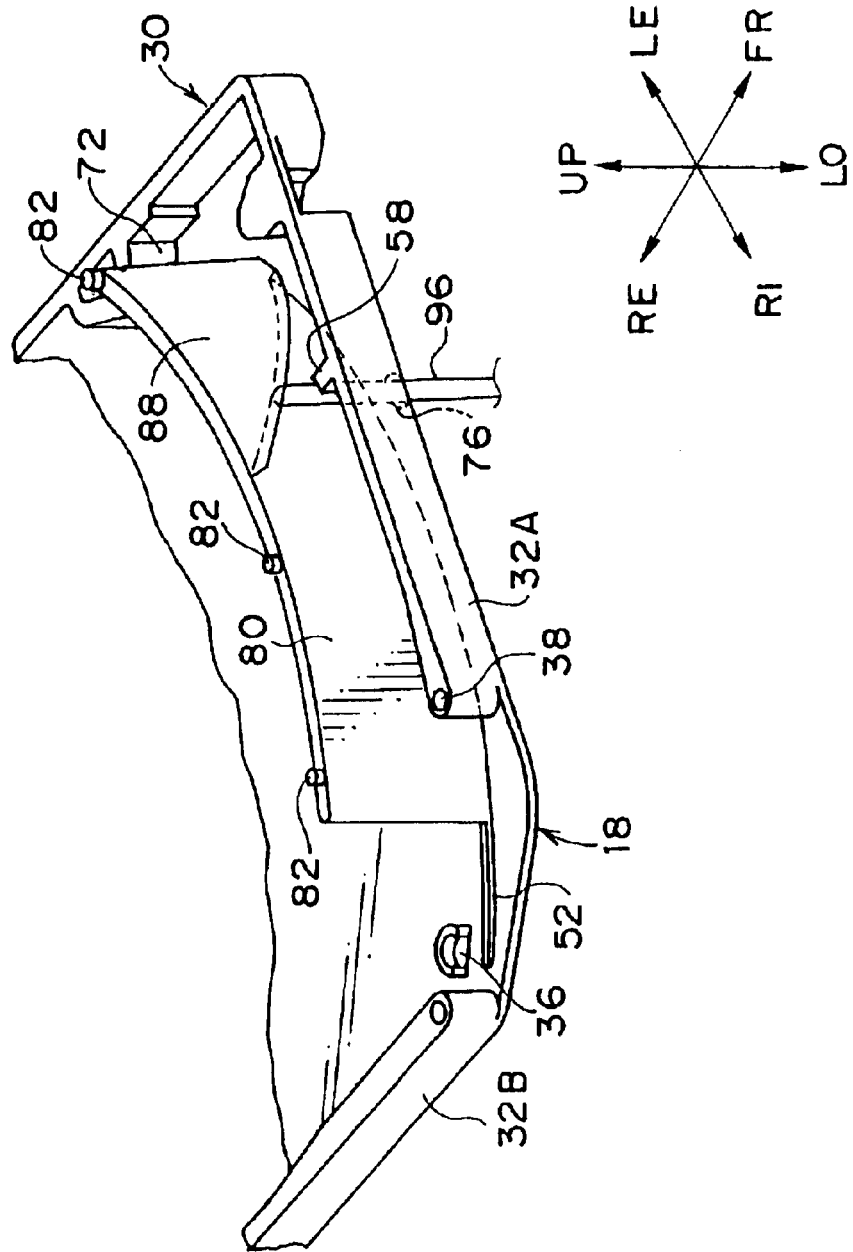
FIG. 12 is a schematic perspective view showing a state in the midst of progression from the state in which the door of FIG. 11 closes the opening to a state in which the opening is open.
Figure 13:
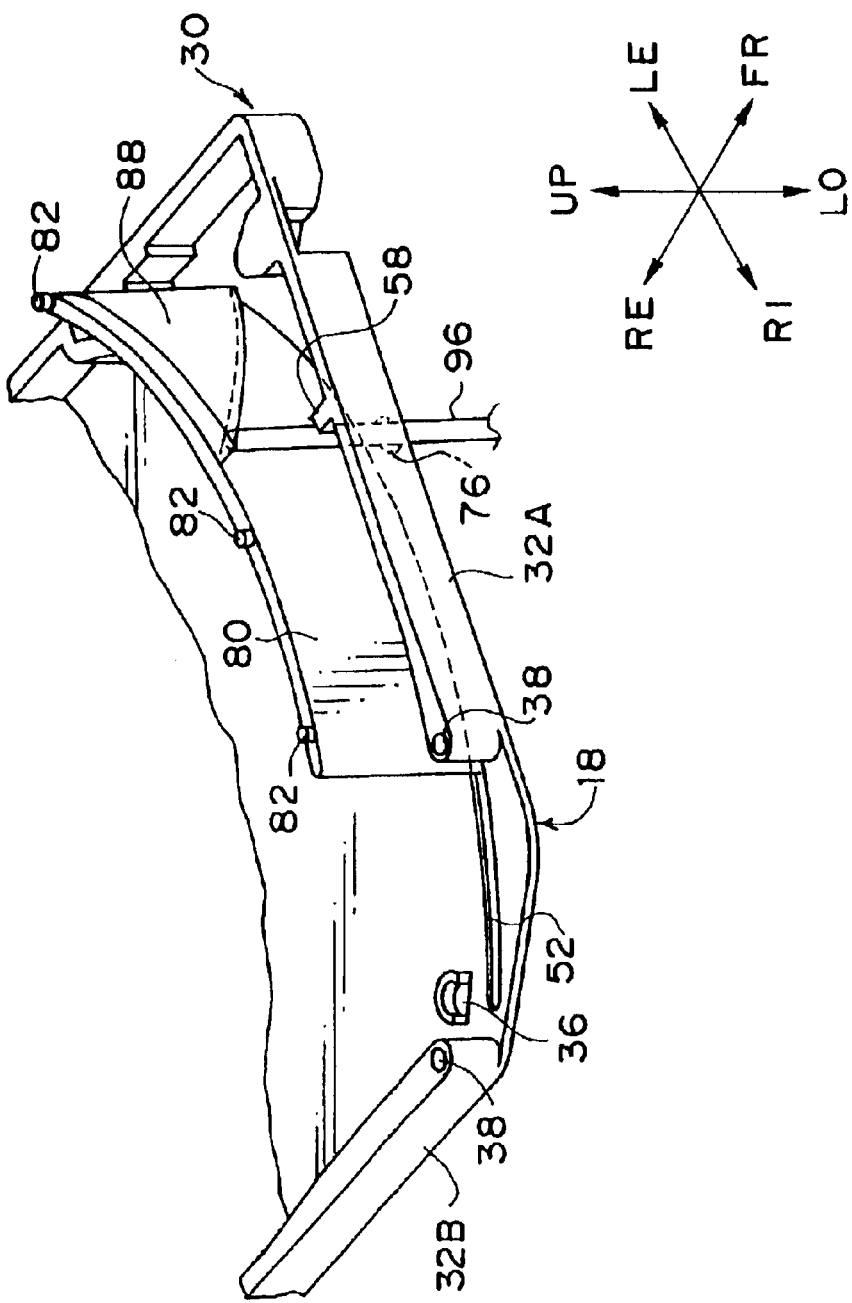
FIG. 13 is a schematic perspective view showing a state of the door of FIG. 11 when the opening is open.
Figure 15:
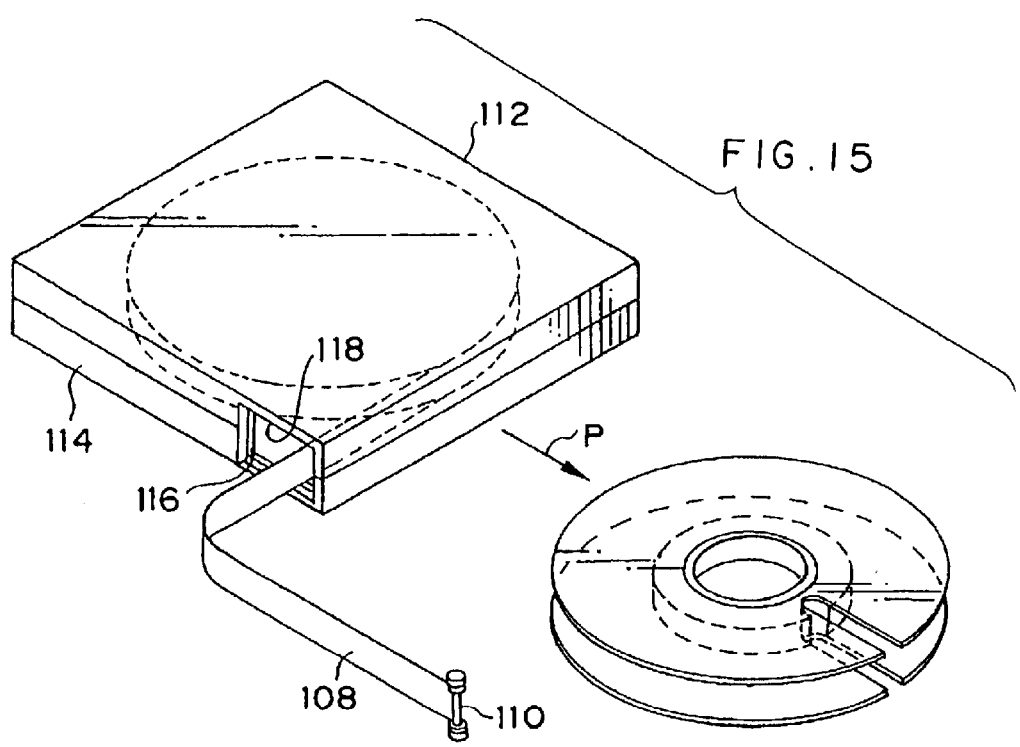
FIG. 15 is a schematic perspective view of a conventional magnetic tape cartridge equipped with a leader pin.
Figure 16:
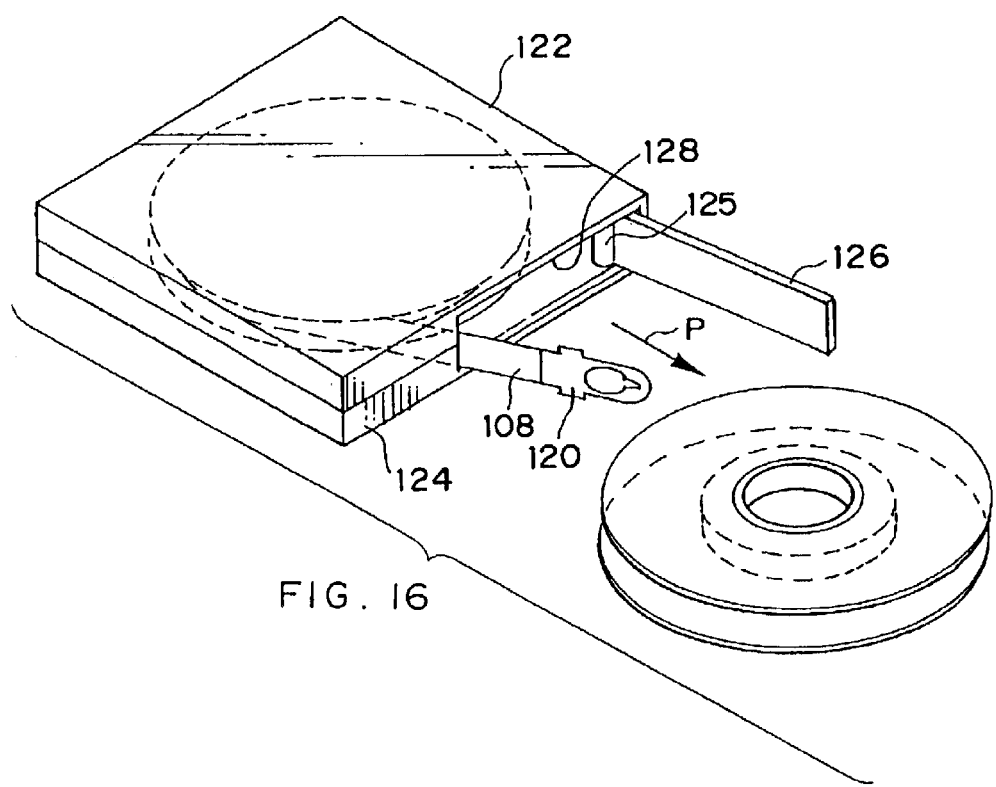
FIG. 16 is a schematic perspective view of a conventional magnetic tape cartridge equipped with a leader tape.
Figure 17:
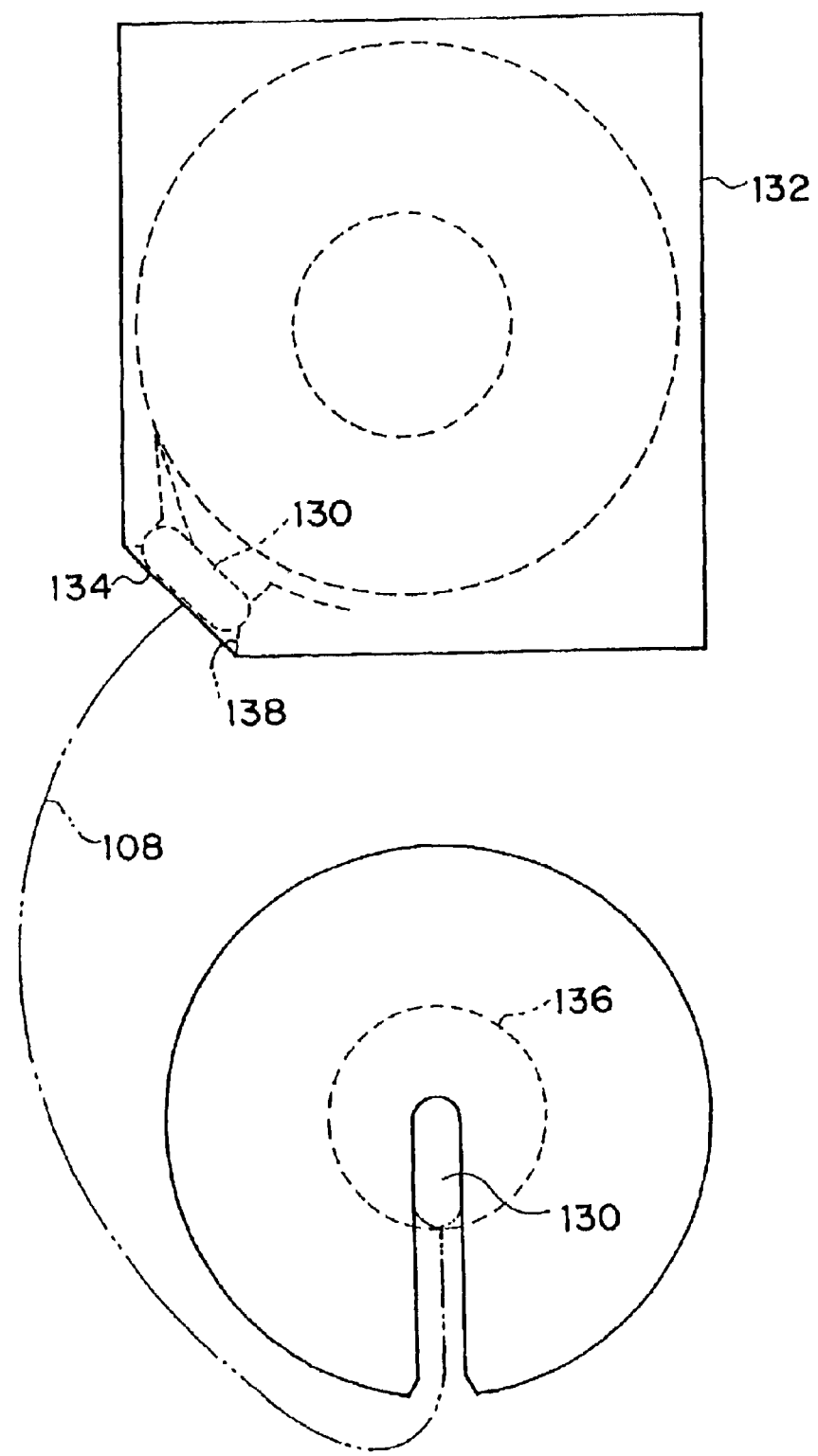
FIG. 17 is a schematic plan view of a conventional magnetic tape cartridge equipped with a leader block.

Next, a second embodiment of the present invention will be described. In the present embodiment, the door opening/closing means and the door opening/closing mechanism differ slightly from those of the first embodiment. The door opening/closing means of the present embodiment, which is shown in FIGS. 11 through 13, is similar to that disclosed in Japanese Patent Application No. 11-331528 (Japanese Patent Application Laid-Open (JP-A) No. 2001-148178) which was filed prior to the present application by the present applicant. Namely, a substantially triangular guide block 88 is fixed to the left end portion of the front surface of the door 80, and a hole 76, through which an engagement pin 96 abutting the guide block 88 is inserted, is formed in the lower case 30. This engagement pin 96 is provided at the drive device, and is inserted through for positioning at the time when the magnetic tape cartridge 10 is loaded into the drive device.

In accordance with this structure, when the magnetic tape cartridge 10 is lowered by being loaded into the drive device and the engagement pin 96 is inserted in from the hole 76, the distal end of the engagement pin 96 abuts the bottom surface of the guide block 88 and pushes the lower surface of the guide block 88. The guide block 88 is thereby moved relatively toward the left by the engagement pin 96. The door 80, to which the guide block 88 is fixed, is slid toward the left such that the opening 18 is opened.

When the opening 18 is to be closed, because the plate spring 86 (not illustrated in FIGS. 11 through 13) urges the door 80 toward the right in the same way as described above, due to the engagement pin 96 being pulled out from the hole 76, the door 80 slides toward the right and closes the opening 18. Note that the guide block 88 may be fixed to the front surface of the door 80 as a separate member, or may be formed integrally with the door 80. Further, because the distal end of the engagement pin 96 abuts the bottom surface of the guide block 88 and slides along this bottom surface, the distal end of the engagement pin 96 is preferably formed as a curved surface. Moreover, providing a covering member (not illustrated), which is urged in the direction of closing the hole 76 at times other than when the magnetic tape cartridge 10 is in use, is preferable in that the magnetic tape cartridge 10 can be kept more free from dust.

As a third embodiment of the present invention, a door opening/closing means such as that shown in FIGS. 14A through 14C may be used. Namely, a pull-out member 90 made of a flexible metal or plastic is mounted to the left end portion of the door 80. The distal end of this pull-out member 90 projects from a hole 78 formed in the left wall 32C (or the left wall 22C) of the magnetic tape cartridge 10. An engagement block 92 is mounted to the distal end of the pull-out member 90. An opening/closing member 100, which engages with the engagement block 92, is provided at the drive device.

In accordance with this structure of the present embodiment, when the magnetic tape cartridge 10 is loaded into a drive device, accompanying this loading, the opening/closing member 100 abuts the engagement block 92, and moves the engagement block 92 relatively toward the rear. Thus, the door 80 slides toward the left via the pull-out member 90, and can open the opening 18 in the same way as described above. Note that, when the opening 18 is to be closed, the plate spring 86 (not illustrated in FIGS. 14A through 14C) urges the door 80 toward the right in the same way as described above, and the opening/closing member 100 releases the pushing of the engagement block 92. Therefore, as the magnetic tape cartridge 10 is ejected from the drive device, the door 80 slides toward the right and closes the opening 18.

In each of the above-described first through third embodiments, the door 80 relating to the present invention is formed in a substantial arc shape as seen in plan view, and slides on a predetermined circumference so as to be accommodated at the inner sides of the front walls 22A, 32A. Accordingly, the large opening 18 provided at the corner portion can be appropriately opened and closed by a simple structure. Note that, even if the opening 18 is formed nearer to the centers of the front walls 22A, 32A rather than at the corner portion, the opening 18 can be reliably opened and closed because the size of the door 80 can be set freely.

The plate spring 86 can be provided at a different place than the opening 18. Therefore, space can be utilized efficiently, the position at which the leader pin 16 attached to the distal end of the magnetic tape 14 is held can be set over a wide width, and the region at which the leader pin 16 can be chucked can be made wide. Therefore, the degrees of freedom in design of the drive device can be increased. In addition, changes in the angle of inclination of the cut-off portion of the corner portion at which the opening 18 is provided can be utilized for identification of the generation (the difference in capacity) of the recording tape cartridge 10 at a library or the like. Therefore, it is possible to prevent the strength from becoming insufficient, the dust-proof property from deteriorating, and the structure of the metal mold from becoming complex, due to the provision of the opening 18 and an identifying means (an unillustrated hole) as is the case in the conventional art.

In accordance with the present invention, the opening is formed by cutting off the front wall side corner portion of the case. Therefore, the open surface of the opening can be oriented toward the front wall, the pull-out means of the drive device can enter in from the front, and the path along which the recording tape is pulled-out can be made to be the shortest. Accordingly, there is no need at the drive device for a complex mechanism for making the recording tape move around non-rectilinearly, and it is possible to design a drive device which is compact and has a low manufacturing cost.

Further, the door is formed in a substantial arc shape, as seen in plan view, which moves on a predetermined circumference. Therefore, the opening can be made large, the structure is simple, and less space is used. Therefore, the space within the case and within the drive device can be utilized efficiently. Accordingly, the area for the cartridge within the drive device can be made small, and the drive device can be made compact.

What is claimed is:

1. A recording tape cartridge comprising: a case which accommodates a single reel, on which a recording tape is wound, such that the reel is rotatable; an opening formed by cutting off a portion of a front wall of the case which front wall faces a drive device at a time when the recording tape cartridge is loaded into the drive device, the opening being for pulling-out of a leader member which is attached to an end portion of the recording tape; and a door formed in a substantial arc shape as seen in plan view, and moving along a predetermined circumference, and opening and closing the opening.

2. The recording tape cartridge of claim 1, wherein the opening is formed by cutting off a corner portion of the case at a front side in a direction of loading the recording tape cartridge into the drive device.

3. The recording tape cartridge of claim 1, wherein the opening is formed by cutting off a portion of the case toward a center of the front wall of the case.

4. The recording tape cartridge of claim 1, further comprising a guide member provided so as to be able to guide the door along the predetermined circumference when the door moves along the predetermined circumference.

5. The recording tape cartridge of claim 4, wherein the guide member includes guide grooves formed along a predetermined circumference at upper and lower inner surfaces of the case, and a plurality of projections provided at the door, and the plurality of projections engage with the guide grooves, and the door is thereby guided along the predetermined circumference.

6. The recording tape cartridge of claim 4, wherein the guide member is a plurality of ribs provided at the case along the predetermined circumference and at both sides of the predetermined circumference, and a distal end surface of each rib, which distal end surface faces the predetermined circumference, functions as a guide surface.

7. The recording tape cartridge of claim 1, wherein a center of rotation of the door is offset from a center of rotation of the reel.

8. The recording tape cartridge of claim 1, further comprising an urging means, for urging the door in a closing direction, provided at a side end of the door opposite a side end at which the opening is provided.

9. The recording tape cartridge of claim 8, wherein the urging means is a plate spring.

10. The recording tape cartridge of claim 1, wherein one projection provided at the door projects further than the case via a hole formed in the case along a predetermined circumferential direction, and the door is operated to open and close by the drive device via the one projection.

11. The recording tape cartridge of claim 1, further comprising: a guide block which has an inclined bottom surface and is integrally provided at a side end of the door opposite a side end at which the opening is provided; and a hole formed in the case, through which an engagement pin of the drive device is inserted and abuts the bottom surface of the guide block, wherein, when the engagement pin is inserted from the hole and abuts the bottom surface of the guide block, the inclined bottom surface of the guide block is pushed by the engagement pin, the door slides, and the opening is opened.

12. The recording tape cartridge of claim 1, further comprising a flexible member whose one end is connected to the door and the other end extends out of the case, wherein the other end of the flexible member engages with the driving device and is moved by the driving device, and thereby the door is opened/closed.

13. A recording tape cartridge comprising: a case which accommodates a single reel, on which a recording tape is wound, such that the reel is rotatable; an opening formed by cutting off a portion of a front wall of the case which front wall faces a drive device at a time when the recording tape cartridge is loaded into the drive device, the opening being for pulling-out of a leader member which is attached to an end portion of the recording tape; a door formed in a substantial arc shape as seen in plan view, and moving along a predetermined circumference, and opening and closing the opening; grooves formed along a predetermined circumference in upper and lower inner surfaces of the case; a plurality of projections provided at the door, and due to the plurality of projections engaging with the grooves, the door is guided along the predetermined circumference; and a hole formed in the case for allowing the drive device to contact the door.

14. The recording tape cartridge of claim 13, further comprising a plurality of ribs provided at the case along the predetermined circumference and at both sides of the predetermined circumference, and a distal end surface of each rib, which distal end surface faces the predetermined circumference, functions as a guide surface.

15. The recording tape cartridge of claim 14, wherein the ribs have a labyrinthine structure impeding entry of dust from the hole.

16. The recording tape cartridge of claim 13, wherein a portion of the grooves is formed as a long, narrow hole so as to function also as a hole for allowing the drive device to contact the door, and one projection among the plurality of projections of the door projects further than the case via the long, narrow hole, and the door is operated to open and close by the drive device via the one projection which projects.

17. The recording tape cartridge of claim 13, further comprising a guide block which is provided integral with a side end of the door opposite the side end at which the opening is provided, and which has an inclined bottom surface, wherein when an engagement pin of the drive device is inserted from the hole and abuts the bottom surface of the guide block, the inclined bottom surface of the guide block is pushed by the engagement pin, the door slides, and the opening is opened.

18. The recording tape cartridge of claim 13, further comprising a flexible member whose one end is connected to the door and the other end extends out of the case, wherein the other end of the flexible member engages with the driving device and is moved by the driving device, and thereby the door is opened/closed.

19. The recording tape cartridge of claim 13, wherein the opening is formed by cutting off a corner portion of the case at a front side in a direction of loading the recording tape cartridge into the drive device.

20. The recording tape cartridge of claim 13, wherein the opening is formed by cutting off a portion of the case toward a center of the front wall of the case.

21. The recording tape cartridge of claim 13, wherein a center of rotation of the door is offset from a center of rotation of the reel.

22. The recording tape cartridge of claim 13, further comprising an urging means, for urging the door in a closing direction, provided at a side end of the door opposite a side end at which the opening is provided.

23. The recording tape cartridge of claim 22, wherein the urging means is a plate spring.

* * * * *